(12) United States Patent
Yoon et al.

(10) Patent No.: US 12,293,577 B2
(45) Date of Patent: May 6, 2025

(54) SYSTEMS AND METHODS FOR IMAGE PROCESSING USING NATURAL LANGUAGE

(71) Applicant: Adobe Inc., San Jose, CA (US)

(72) Inventors: Seunghyun Yoon, San Jose, CA (US); Trung Huu Bui, San Jose, CA (US); Franck Dernoncourt, San Jose, CA (US); Hyounghun Kim, Chapel Hill, NC (US); Doo Soon Kim, San Jose, CA (US)

(73) Assignee: Adobe Inc., San Jose, CA (US)

( * ) Notice: Subject to any disclaimer, the term of this patent is extended or adjusted under 35 U.S.C. 154(b) by 315 days.

(21) Appl. No.: 17/651,771

(22) Filed: Feb. 18, 2022

(65) Prior Publication Data

US 2023/0267726 A1    Aug. 24, 2023

(51) Int. Cl.
| | |
|---|---|
| *G06V 10/86* | (2022.01) |
| *G06F 40/284* | (2020.01) |
| *G06N 3/044* | (2023.01) |
| *G06N 3/088* | (2023.01) |
| *G06V 10/77* | (2022.01) |
| *G06V 10/80* | (2022.01) |
| *G06V 10/82* | (2022.01) |

(52) U.S. Cl.
CPC ............ *G06V 10/86* (2022.01); *G06F 40/284* (2020.01); *G06N 3/044* (2023.01); *G06N 3/088* (2013.01); *G06V 10/7715* (2022.01); *G06V 10/806* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 11,676,410 B1 * | 6/2023 | Sandu | G06V 30/416 |
| | | | 382/156 |
| 2018/0268548 A1 * | 9/2018 | Lin | G06N 3/084 |

(Continued)

FOREIGN PATENT DOCUMENTS

EP            3926531 A1 * 12/2021    .......... G06F 16/5846

OTHER PUBLICATIONS

Cheng, Y., Gan, Z., Li, Y., Liu, J., & Gao, J. (2020). Sequential Attention GAN for Interactive Image Editing. arXiv.Org. https://doi.org/10.48550/arxiv.1812.08352 (Year: 2020).*

(Continued)

*Primary Examiner* — Amandeep Saini
*Assistant Examiner* — Caroline Tabancay Duffy
(74) *Attorney, Agent, or Firm* — Weaver Austin Villeneuve & Sampson LLP

(57) ABSTRACT

Embodiments of the disclosure provide a machine learning model for generating a predicted executable command for an image. The learning model includes an interface configured to obtain an utterance indicating a request associated with the image, an utterance sub-model, a visual sub-model, an attention network, and a selection gate. The machine learning model generates a segment of the predicted executable command from weighted probabilities of each candidate token in a predetermined vocabulary determined based on the visual features, the concept features, current command features, and the utterance features extracted from the utterance or the image.

20 Claims, 11 Drawing Sheets

(56) References Cited

U.S. PATENT DOCUMENTS

| | | | |
|---|---|---|---|
| 2019/0286691 A1* | 9/2019 | Sodhani | G06F 40/216 |
| 2020/0349464 A1* | 11/2020 | Lin | G06N 3/084 |
| 2021/0249034 A1* | 8/2021 | Li | G06V 10/82 |
| 2021/0383584 A1* | 12/2021 | Zhang | G06T 1/20 |
| 2021/0406619 A1* | 12/2021 | Lv | G06T 7/70 |
| 2022/0019734 A1* | 1/2022 | Kurma | G06V 10/764 |
| 2022/0068296 A1* | 3/2022 | Wilson | G06T 13/205 |
| 2022/0382800 A1* | 12/2022 | Abraham | G06F 16/45 |
| 2023/0186668 A1* | 6/2023 | Dong | G06F 40/114 |
| | | | 382/176 |

OTHER PUBLICATIONS

See, A., Liu, P. J., & Manning, C. D. (2017). Get To The Point: Summarization with Pointer-Generator Networks. arXiv.Org. https://doi.org/10.48550/arxiv.1704.04368 (Year: 2017).*

Alamri, H. et al. "Audio Visual Scene-Aware Dialog", 2019 IEEE/CVF Conference on Computer Vision and Pattern Recognition (CVPR), arXiv:1901.09107v2 [cs.CV], May 8, 2019.

Chen, H. et al. "Touchdown: Natural Language Navigation and Spatial Reasoning in Visual Street Environments", 2019 IEEE/CVF Conference on Computer Vision and Pattern Recognition (CVPR), arXiv:1811.12354v7 [cs.CV], May 16, 2020.

Chen, J. et al. "Language-Based Image Editing with Recurrent Attentive Models." 2018 IEEE/CVF Conference on Computer Vision and Pattern Recognition, arXiv:1711.06288v2 [cs.CV], Jun. 10, 2018.

Cheng, Y. et al. "Sequential Attention GAN for Interactive Image Editing", Proc. of the 28th ACM International Conference on Multimedia, arXiv:1812.08352v4 [cs.CV], Aug. 5, 2020.

Das, A. et al. "Visual Dialog", 2017 IEEE Conference on Computer Vision and Pattern Recognition (CVPR), arXiv:1611.08669v5 [cs.CV], Aug. 1, 2017.

De Vries, H. et al. "GuessWhat?! Visual Object Discovery through Multi-modal Dialogue", 2017 IEEE Conference on Computer Vision and Pattern Recognition (CVPR), arXiv:1611.08481v2 [cs.AI], Feb. 6, 2017.

El-Nouby, A. et al. "Tell, Draw, and Repeat: Generating and Modifying Images Based on Continual Linguistic Instruction," 2019 IEEE/CVF International Conference on Computer Vision (ICCV), arXiv:1811.09845v3 [cs.CV], Sep. 23, 2019.

Fu, T-J., et al. "SSCR: Iterative Language-Based Image Editing via Self-Supervised Counterfactual Reasoning", Conference on Empirical Methods in Natural Language Processing (EMNLP), pp. 4413-4422, 2020, doi: 10.18653/v1/2020.emnlp-main.357.

Gehring, J. et al. "Convolutional Sequence to Sequence Learning." Proc. 34th International Conference on Machine Learning (ICML), arXiv:1705.03122v3 [cs.CL], Jul. 25, 2017.

Girshick, R. "Fast R-CNN," 2015 IEEE International Conference on Computer Vision (ICCV), pp. 1440-1448, 2015, doi: 10.1109/ICCV.2015.169.

Gu, J. et al. "Incorporating Copying Mechanism in Sequence-to-Sequence Learning", Proc. of the 54th Annual Meeting of the Association for Computational Linguistics (ACL), pp. 1631-1640, 2016, doi: 10.18653/v1/P16-1154.

Haber, J. et al. "The PhotoBook Dataset: Building Common Ground through Visually-Grounded Dialogue", Proc. of the 57th Annual Meeting of the Association for Computational Linguistics (ACL), pp. 1895-1910, 2019, doi: 10.18653/v1/P19-1184.

Hochreiter, S. et al. "Long Short-Term Memory", Neural Computation, 9(8):1735-1780, 1997, doi: 10.1162/neco.1997.9.8.1735.

Hu, R. et al. "Natural Language Object Retrieval", 2016 IEEE Conference on Computer Vision and Pattern Recognition (CVPR), arXiv:1511.04164v3 [cs.CV], Apr. 11, 2016.

Kazemzadeh, S. et al. "ReferItGame: Referring to Objects in Photographs of Natural Scenes", Proc. of the 2014 Conference on Empirical Methods in Natural Language Processing (EMNLP), pp. 787-798, 2014, doi: 10.3115/v1/D14-1086.

Kim, J-H. et al. "CoDraw: Collaborative Drawing as a Testbed for Grounded Goal-driven Communication", Proc. of the 57th Annual Meeting of the Association for Computational Linguistics (ACL), pp. 6495-6513, 2019, doi: 10.18653/v1/P19-1651.

Kingma, D. et al. "Adam: A Method for Stochastic Optimization", Proceedings of the 3rd International Conference for Learning Representations (ICLR 2015), arXiv:1412.6980v9 [cs.LG], Jan. 30, 2017.

Li, H. et al. "Keywords-Guided Abstractive Sentence Summarization", The Thirty-Fourth AAAI Conference on Artificial Intelligence, pp. 8196-8203, 2020, doi: 10.1609/AAAI.V34I05.6333.

Lin, T-H. et al. "A Multimodal Dialogue System for Conversational Image Editing", Workshop at the 32nd Conference on Neural Information Processing Systems (NIPS 2018), arXiv.2002.06484v1 [cs.CL], Feb. 16, 2020.

Lin, T-H. et al. "Adjusting Image Attributes of Localized Regions with Low-level Dialogue", Proc. of the 12th Conference on Language Resources and Evaluation (LREC 2020), pp. 405-412, 2020.

Lin, T-Y. et al. "Microsoft COCO: Common Objects in Context". Proc. European Conference on Computer Vision (ECCV 2014), arXiv:1405.0312v3 [cs.CV], Feb. 21, 2015.

Manuvinakurike, R. et al. "Conversational Image Editing: Incremental Intent Identification in a New Dialogue Task", Proc. of the SIGDIAL 2018 Conference, pp. 284-295, 2018, doi: 10.18653/v1/W18-5033.

Manuvinakurike, R. et al. "DialEdit: Annotations for Spoken Conversational Image Editing", Proc. of 14th Joint ACL-ISO Workshop on Interoperable Semantic Annotation, 2018, 9 pages.

Manuvinakurike, R. et al. "Edit me: A Corpus and a Framework for Understanding Natural Language Image Editing", Proc. of the Eleventh International Conference on Language Resources and Evaluation (LREC 2018), pp. 4322-4326, 2018.

Mao, J. et al. "Generation and Comprehension of Unambiguous Object Descriptions", 2016 IEEE Conference on Computer Vision and Pattern Recognition (CVPR), pp. 11-20, 2016, doi: 10.1109/CVPR.2016.9.

Miao, Y. et al. "Language as a Latent Variable: Discrete Generative Models for Sentence Compression", Proc. of the 2016 Conference on Empirical Methods in Natural Language Processing (EMNLP), pp. 319-328, 2016, doi: 10.18653/v1/D16-1031.

Moon, S. et al. "Situated and Interactive Multimodal Conversations", Proc. of the 28th International Conference on Computational Linguistics (COLING), pp. 1103-1121, 2020, doi: 10.18653/V1/2020.COLING-MAIN.96.

Mostafazadeh, N. et al. "Image-Grounded Conversations: Multimodal Context for Natural Question and Response Generation", Proc. of the 8th International Joint Conference on Natural Language Processing (IJCNLP), arXiv:1701.08251v2 [cs.CL], Apr. 20, 2017.

Papineni, K. et al. "Bleu: a Method for Automatic Evaluation of Machine Translation", Proc. of the 40th Annual Meeting of the Association for Computational Linguistics (ACL), pp. 311-318, 2002, doi: 10.3115/1073083.1073135.

Pasunuru, R. et al. "Game-Based Video-Context Dialogue", Proc. of the 2018 Conference on Empirical Methods in Natural Language Processing (EMNLP), arXiv:1809.04560v2 [cs.CL], Oct. 17, 2018.

Paszke, A. et al. "Automatic differentiation in PyTorch", Workshop at the 31st Conference on Neural Information Processing Systems (NIPS), 2017, 4 pages.

Qi, Y. et al. "REVERIE: Remote Embodied Visual Referring Expression in Real Indoor Environments", 2020 IEEE/CVF Conference on Computer Vision and Pattern Recognition (CVPR), arXiv:1904.10151v2 [cs.CV], Jan. 6, 2020.

Saha, A. et al. "Towards Building Large Scale Multimodal Domain-Aware Conversation Systems", The Thirty-Second AAAI Conference on Artificial Intelligence, pp. 696-704, 2018.

See, A. et al. "Get To The Point: Summarization with Pointer-Generator Networks", Proc. of the 55th Annual Meeting of the Association for Computational Linguistics (ACL), arXiv:1704.04368v2 [cs.CL], Apr. 25, 2017.

Shi, J. et al. "A Benchmark and Baseline for Language-Driven Image Editing". Proc. of the 15th Asian Conference on Computer Vision (ACCV 2020), arXiv:2010.02330v1 [cs.CV], Oct. 5, 2020.

(56) References Cited

OTHER PUBLICATIONS

Shinagawa, S. et al. "Interactive Image Manipulation with Natural Language Instruction Commands", Workshop at the 31st Conference on Neural Information Processing Systems (NeurIPS), 2017, 9 pages.

Shuster, K. et al. "Image-Chat: Engaging Grounded Conversations", Proceedings of the 58th Annual Meeting of the Association for Computational Linguistics (ACL), pp. 2414-2429, 2020, doi: 10.18653/v1/2020.acl-main.219.

Stiennon, N. et al. "Learning to summarize from human feedback", Workshop at the 34th Conference on Neural Information Processing Systems (NeurIPS 2020), arXiv:2009.01325v3 [cs.CL], Feb. 15, 2022.

Tan, H. et al. "Expressing Visual Relationships via Language", Proc. of the 57th Annual Meeting of the Association for Computational Linguistics (ACL), pp. 1873-1883, 2019, doi: 10.18653/v1/P19-1182.

Vaswani, A. et al. "Attention Is All You Need", Workshop at the 31st Conference on Neural Information Processing Systems (NeurIPS), arXiv:1706.03762v5 [cs.CL], Dec. 6, 2017.

Vinyals, O. et al. "Pointer Networks", Advances in Neural Information Processing Systems (NIPS 2015), arXiv:1506.03134v2 [stat.ML], Jan. 2, 2017.

Yu, L. et al. "MAttNet: Modular Attention Network for Referring Expression Comprehension," 2018 IEEE/CVF Conference on Computer Vision and Pattern Recognition (CVPR 2018), arXiv:1801.08186v3 [cs.CV], Mar. 27, 2018.

\* cited by examiner

SYSTEMS AND METHODS FOR IMAGE PROCESSING USING NATURAL LANGUAGE

TECHNICAL FIELD

The present disclosure relates to systems and methods for processing images using natural language, and more particularly to systems and methods for generating executable commands for controlling an image editing tool using natural language to process an image.

BACKGROUND

Processing images such as editing and/or searching relative images are widely used, e.g., in project designs such as posters, brochures, flyers, etc. Normally, operations performed on an image are executed through controlling image editing tools. For example, when a user intends to perform a "blur the detail operation" on an image, the user has to find the technical term of the image characteristic (e.g., sharpness) corresponding to his intention (e.g., change the clarity of the detail in the image), and find the command button corresponding to the technical term in the editing tool interface. Existing image editing tools can be complex to operate because the image editing tools presume certain expertise (e.g., knowledge in photo effects) to know the proper technical term to select the correct executable command. Also, the more sophisticated an image editing tool is (e.g., having many possible editing operations), the more complex the operating interface will be.

Embodiments of the disclosure address these and other problems by providing methods and systems for using natural language to process an image.

SUMMARY

Embodiments of the disclosure provide a non-transitory computer-readable medium storing instruction that, when executed by one or more processors, cause the one or more processors to perform operations for generating a predicted executable command for an image. The operation includes receiving, via a user interface, an utterance indicating a request associated with an image and generating an utterance feature vector based on utterance features extracted from the utterance. The operation also includes accessing the image corresponding to the utterance and generating a visual feature vector based on visual features extracted from the image. The operation further includes generating a concept feature vector based on concept features extracted from the image and generating a first fused feature vector based on aligning the utterance feature vector and the visual feature vector. The operation additionally includes generating a second fused feature vector based on aligning the first fused feature vector and a current command feature vector and generating a segment of a predicted executable command corresponding to the request associated with image based on the second fused feature vector, the current command feature vector, the utterance feature vector, and the concept feature vector.

Embodiments of the disclosure provide also provide a computer-implemented method for generating a predicted executable command for an image, the computer-implemented method. The method includes receiving an utterance indicating a request associated with the image and generating an utterance feature vector based on inputting the utterance into a recurrent neural network. The method also includes receiving the image corresponding to the utterance and generating a visual feature vector and a concept feature vector based on inputting the image into a convolutional network. The method further includes generating a first fused feature vector based on inputting the utterance vector and the visual vector to an attention mechanism; generating a second fused feature vector based on inputting the first fused feature vector and a command feature vector to the attention mechanism. The method yet includes calculating weighted probabilities for each candidate token in a predetermined vocabulary based on the second fused feature vector, the current command feature vector, the utterance feature vector, and the concept feature vector and generating a segment of the predicted executable command based on the weighted probabilities.

Embodiments of the disclosure provide further provide a machine learning model for generating a predicted executable command for an image. The machine learning model includes an utterance sub-model configured to extract utterance features from an utterance indicating a request associated with the image and generate an utterance feature vector based on the utterance features, and a visual sub-model configured to extract visual features and concept features from the image and generate a visual feature vector and a concept feature vector based on the visual features and the concept features respectively. The machine learning model also includes an attention network configured to generate a first fused feature vector based on aligning the utterance feature vector and the visual feature vector and generate a second fused feature vector based on aligning the first fused feature vector and a current command feature vector. The machine learning model further includes a selection gate configured to generate a segment of the predicted executable command from weighted probabilities of each candidate token in a predetermined vocabulary determined based on the second fused feature vector, the concept features, and the utterance features.

It is to be understood that both the foregoing general descriptions and the following detailed descriptions are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Existing image editing tools require certain expertise (e.g., expertise in photo effects, color theory, etc.) to make proper editing commends (e.g., color change, brightness change, contrast change, etc.). Also, different image editing tools have different interfaces which are usually complicated. It is especially hard for beginners (e.g., someone not familiar with image processing) to use existing image editing tools to process (e.g., perform operations on) image(s).

The technical solution disclosed herein allows natural language (e.g., utterance(s)) to be used to perform operations on images (e.g., search an image and/or editing an image). Specifically, a trained machine learning model (e.g., implemented using one or more neural networks) will take utterance(s) as input to generate executable command(s) for controlling an image editing tool (e.g., Adobe Photoshop™, Adobe Lightroom™, etc.) to process the image. According to certain embodiments, the technical solution performs intermediate operations e.g., predicting/generating executable commands indicating an operation request on a relevant image in response to the input utterance. In some scenarios, the relevant image is a search result of a search engine (e.g., by searching the Internet and/or a database) invoked by the utterance, and/or is an image pre-selected by the user. Examples of the executable commands include editing the relevant image (e.g., color change, brightness change, contrast change, rotation, background removal, etc.) or searching an image (e.g., using characteristics of the image to find other images with similar characteristics).

In some embodiments, in addition to the input utterance indicating the intended action/operation (e.g., editing and/or searching request on the image), other inputs are also fed to the trained machine learning model to generate a current executable command. These other inputs include the image history (e.g., a series of images previously presented simultaneously or sequentially), the utterance history (e.g., the utterances previously input during the same communication session/conversation), and/or the previously generated/predicted executed command (e.g., appended to the last utterance in the utterance history). The current executable command corresponds to the intended action/operation and will be outputted by the trained machine learning model in a segment-by-segment manner (e.g., one segment at a time). A segment of an executable command is also referred to as a token. Accordingly, operations can be performed on an image using natural language (e.g., by inputting utterances) to improve the usability of the image editing tools and to reduce the complexity of the user interface.

Figure 1:
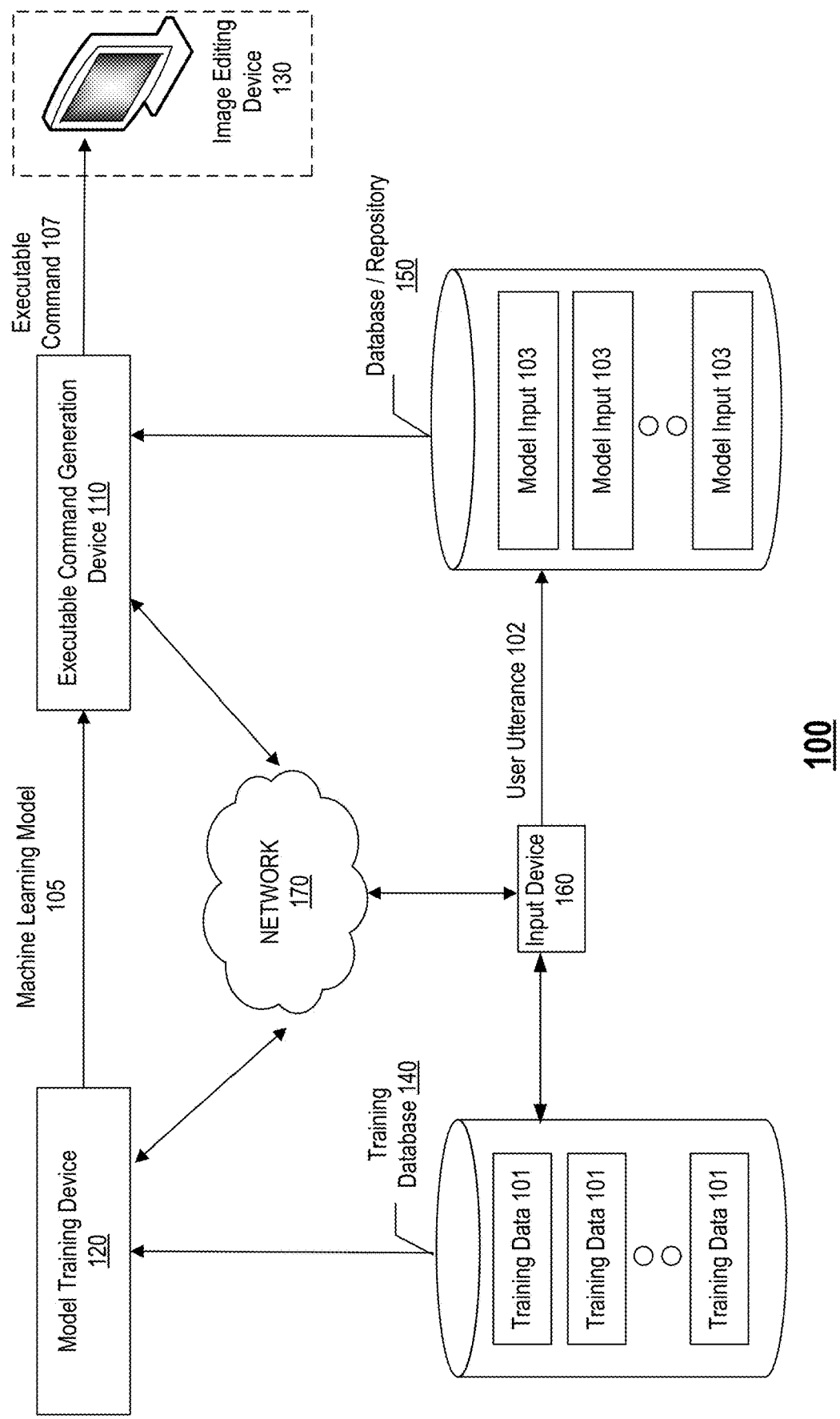
FIG. 1 illustrates a block diagram of an exemplary image editing system, according to embodiments of the disclosure.

FIG. 1 illustrates a block diagram of an exemplary image processing system 100, according to embodiments of the disclosure. Image processing system 100 includes an executable command generation device 110 to generate executable command 107 by using a trainable machine learning model (e.g., machine learning model 105). Executable command 107 is configured to perform operations (e.g., searching and/or editing) on an image (e.g., an image included as part of model input 103) based on one or more utterance 102. In some embodiments, machine learning model 105 is trained by a model training device 120 using training data 101 that includes sample utterance(s), sample image(s) and the corresponding sample executable commands manually selected by operators (e.g., pairs of annotators).

In some embodiments, image processing system 100 will include components shown in FIG. 1, including an executable command generation device 110, a model training device 120, a training database 140, a database/repository 150, an input device 160, and a network 170 to facilitate communications among the various components. In some embodiments, image processing system 100 will optionally connect to an image editing device 130 to implement executable command 107 (e.g., perform operations on the image).

It is possible that image processing system 100 includes more or less components compared to those shown in FIG. 1. For example, when the trainable machine learning model (e.g., machine learning model 105) is pre-trained for generating executable command, image processing system 100 can omit the model training device. One or more of model training device 120, executable command generation device 110, image editing device 130, and/or input device 160 can also be integrated into a single computing device. For example, input device 160 (e.g., a microphone) and image editing device 130 (e.g., processor executing image editing software) can be implemented in a single client computing device.

In some embodiments, image processing system 100 optionally includes network 170 to facilitate the communication among the various components of image processing system 100, such as databases 140 and 150, devices 110 and 120, and input device 160. For example, network 170 may be a local area network (LAN), a wireless network, a personal area network (PAN), metropolitan area network (MAN), a wide area network (WAN), etc. In some embodiments, wired data communication systems or devices can be used to implement network 170.

In some embodiments, the various components of image processing system 100 are remote from each other or are in different locations and be connected through network 170 as shown in FIG. 1. In some alternative embodiments, certain components of image processing system 100 are located on the same site or inside a same device. For example, training database 140 can be located on-site with or be part of model training device 120. As another example, model training device 120 and executable command generation device 110 can be inside the same computer or processing device.

Image processing system 100 stores training data 101 including sample utterances, sample images to be operated on (e.g., relevant images), and the corresponding sample executable commands, and model input 103 including utterance 102 and images the user intend to operate on. For example, in some embodiments, training data 101 is stored in training database 140, and the model input 103 is inputted to and stored in database/repository 150.

In some embodiments, utterance 102 is received from input device 160 (e.g., input by the user) and transmitted to database/repository 150 and be part of model input 103. In some embodiments, the image to be operated on (e.g., images related to utterance 102) is received from a search engine (now shown) by searching the Internet, a local database, and/or is pre-selected by the user and is grouped with utterance 102 in database/repository 150 as part of model input 103.

In some embodiments, images to be operated on in training data 101 are received in a manner similar to the image in model input 103. The sample utterances, and the corresponding sample executable commends included in training data 101 are manually inputted and/or checked by operators and are stored in pairs in training data 101 along with the sample image to be operated on. For example, when collecting training data 101, the operators (e.g., annotators) are divided into two groups, e.g., user-annotators and assistant-annotators. The user-annotators input sample utterances indicating intended requests (e.g., making requests throughout an operating session/conversation) and the assistant-annotators manually associate corresponding sample executable commends (e.g., associate the intended request) with the input utterances. In some embodiments, if the intended requests indicated by the user is not clear to the utterance assistant-annotators, a clarification request is made and is associated with the sample utterance to be part of training data 101.

In some embodiments, machine learning model 105 (the structure of machine learning network model is described in detail in connection with FIG. 3) includes an utterance sub-model, a visual sub-model, an attention network, and a selection gate. The utterance sub-model is configured to extract utterance features from the input utterance and generate an utterance feature vector based on the utterance features. The visual sub-model is configured to extract visual features and concept features from the image and generate a visual feature vector and a concept feature vector based on the visual features and the concept features, respectively. The attention network is configured to generate a first fused feature vector based on aligning the utterance feature vector and the visual feature vector, and to generate a second fused feature vector based on aligning the first fused feature vector and a current command feature vector. The selection gate is configured to generate a segment of the predicted executable command from weighted probabilities of each candidate token in a predetermined vocabulary, the segment being determined based on the second fused feature vector, the concept features, and the utterance features.

In some embodiments, the model training process is performed by model training device 120. As used herein, "training" a learning model refers to determining one or more parameters of at least one layer in the learning model. For example, a convolutional layer of the visual sub-model (e.g., a Faster Region Based Convolutional Neural Networks (RCNN) network) in machine learning model 105 includes at least one filter or kernel. One or more parameters, such as kernel weights, size, shape, and structure, of the at least one filter is determined by e.g., an end-to-end training process. Consistent with some embodiments, machine learning model 105 can be trained based on any suitable methods such as supervised, semi-supervised, or non-supervised methods.

As show in FIG. 1, executable command generation device 110 receives trained machine learning model 105 from model training device 120. In some embodiments, executable command generation device 110 includes a processor and a non-transitory computer-readable medium (not shown). The processor performs instructions of an executable command generation process stored in the medium. In some embodiments, executable command generation device 110 additionally include input and output interfaces to communicate with database/repository 150, input device 160, network 170, and/or a user interface of image editing device 130. In some embodiments, the input interface is configured to receive model input 103 and/or initiate the executable command generation process, and the output interface is configured to provide the generated/predicted executable command 107.

In some embodiments, model training device 120 communicates with training database 140 to receive one or more set of training data 101. Model training device 120 uses training data 101 received from training database 140 to train a learning model, e.g., machine learning model 105 (the training process is described in detail in connection with FIG. 6). In some embodiments, model training device 120 is implemented with hardware programmed by software that performs the training process. For example, model training device 120 includes a processor and a non-transitory computer-readable medium (not shown). The processor conducts the training by performing instructions of a training process stored in the computer-readable medium. In some embodiments, model training device 120 additionally includes input and output interfaces to communicate with training database 140, network 170, and/or a user interface (not shown). In some embodiments, the user interface is used for selecting sets of training data, adjusting one or more parameters of the training process, selecting or modifying a framework of the learning model, and/or manually or semi-automatically providing the corresponding sample executable command to the sample utterance.

Figure 8:
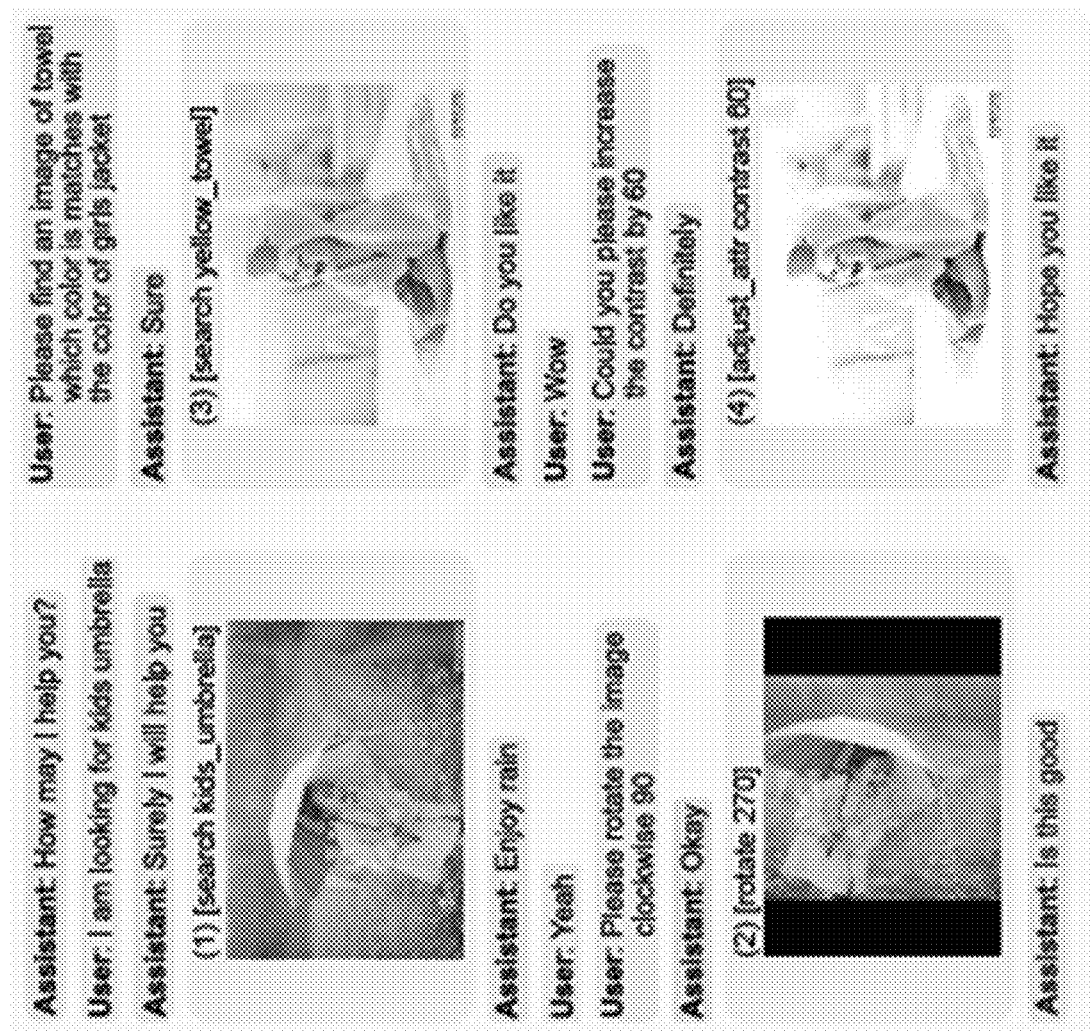
FIG. 8 shows an exemplary user interface, according to embodiments of the disclosure.

In some embodiments, image processing system 100 optionally includes image editing device 130 for implementing executable command 107 generated/predicted by executable command generation device 110. In some embodiments, image editing device 130 communicates with executable command generation device 110 to receive one or more executable command 107. In some embodiments, image editing device 130 is implemented with hardware programmed by software (e.g., Adobe Photoshop™, Adobe Lightroom™, etc.) that performs image editing. For example, in some embodiments, image editing device 130 includes a processor and a non-transitory computer-readable medium (not shown). The processor implements executable command 107 by performing instructions of image editing stored in the computer-readable medium. In some embodiments, image editing device 130 additionally includes input and output interfaces to communicate with executable command generation device 110 and/or a user interface. For example, FIG. 8 shows an exemplary user interface, according to embodiments of the disclosure. In some embodiments, the user interface is used for manually or semi-automatically select or adjust executable command to improve implementation of the user's intention. In some embodiments, image editing device 130 is part of executable command generation device 110 or is part of the same computing device as executable command generation device 110.

Figure 2:
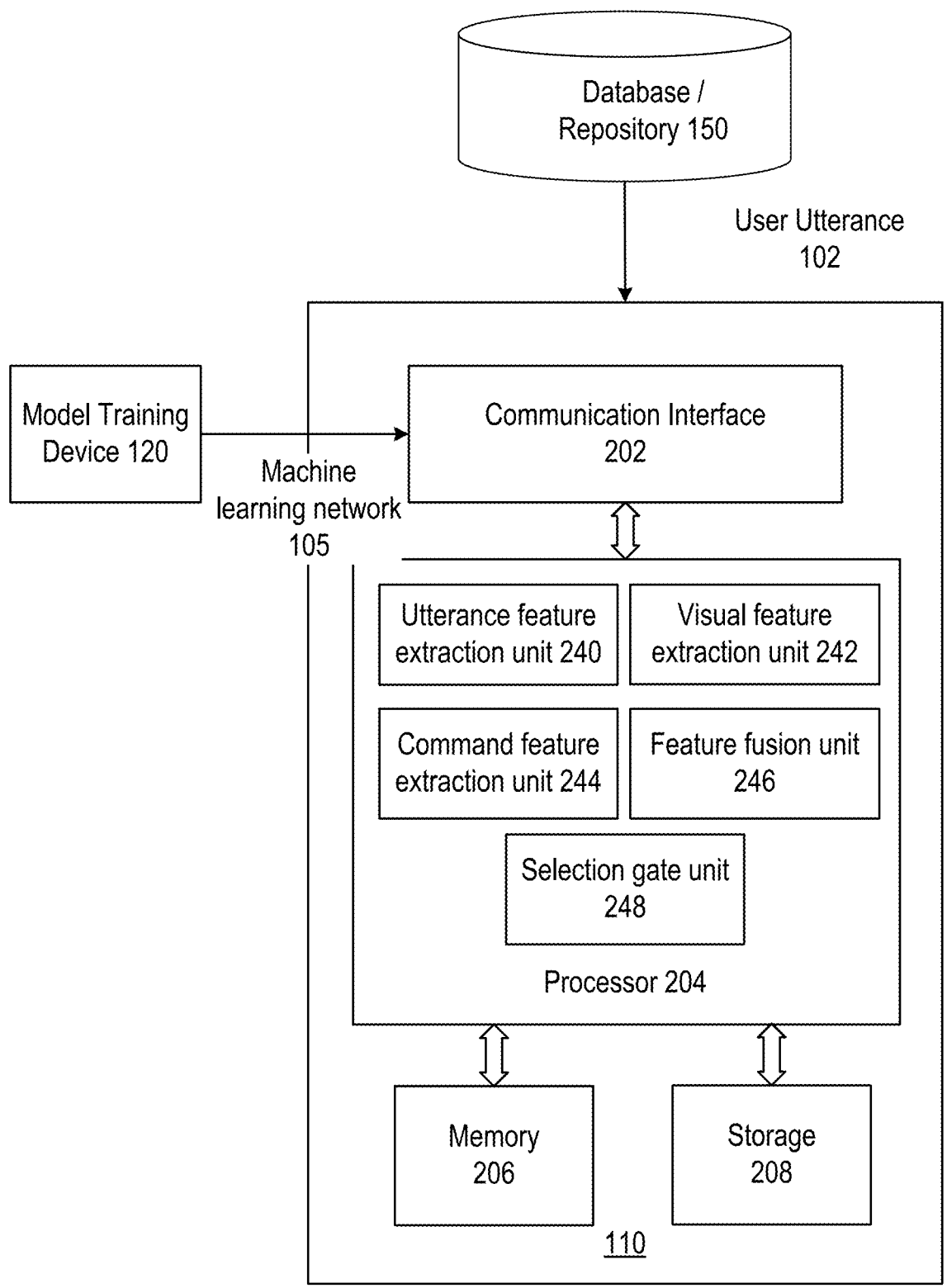
FIG. 2 illustrates a block diagram of an exemplary executable command generation device, according to embodiments of the disclosure.

FIG. 2 illustrates a block diagram of an exemplary executable command generation device 110, according to embodiments of the disclosure. As shown in FIG. 2, executable command generation device 110 includes a communication interface 202, a processor 204, a memory 206, and a storage 208. In some embodiments, executable command generation device 110 has different modules implemented in a single device, such as an integrated circuit (IC) chip (e.g., implemented as an application-specific integrated circuit (ASIC) or a field-programmable gate array (FPGA)), or separate devices with dedicated functions. In some embodiments, one or more components of executable command generation device 110 is located in the cloud or is alternatively in a single location (e.g., inside a user equipment) or distributed locations. Consistent with the president disclosure, executable command generation device 110 is configured to generate/predicate executable commands based on model input 103 received from database/repository 150.

In some embodiments, communication interface 202 sends data to and receive data from components such as database/repository 150, input device 160, model training device 120 and/or image editing device 130 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 includes an integrated service digital network (ISDN) card, cable modem, satellite modem, or a modem to provide a data communication connection. In some other embodiments, communication interface 202 includes a local area network (LAN) card to provide a data communication connection to a compatible LAN. Wireless links can also be implemented by communication interface 202. In such an implementation, communication interface 202 sends and receives electrical, electromagnetic or optical signals that carry digital data streams representing various types of information.

Consistent with some embodiments, communication interface 202 receives machine learning model 105 from model training device 120, and model input 103 from database/repository 150. In some embodiments, communication interface 202 further provides model input 103 and machine learning network 105 to memory 206 and/or storage 208 for storage or to processor 204 for processing.

In some embodiments, processor 204 includes any appropriate type of general-purpose or special-purpose microprocessor, digital signal processor, or microcontroller. In some embodiments, processor 204 is configured as a separate processor module dedicated to generate/predicate executable commands based on model input 103 using a learning model (e.g., machine learning model 105). In some other embodiments, processor 204 is configured as a shared processor module for performing other functions in addition to executable commands generation/prediction.

In some embodiments, memory 206 and storage 208 includes any appropriate type of mass storage provided to store any type of information that processor 204 needs to operate. In some embodiments, memory 206 and storage 208 are any combination of volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. In some embodiments, memory 206 and/or storage 208 is configured to store one or more computer programs that is executed by processor 204 to perform functions disclosed herein. For example, memory 206 and/or storage 208 is configured to store program(s) that is executed by processor 204 to generate/predicate executable commands based on model input 103.

In some embodiments, memory 206 and/or storage 208 are also configured to store intermediate data such as the utterance history (e.g., utterances previously entered by the user during the same session/conversation), the image history (e.g., images the user previously operated on), and the previously executed commands (e.g., executable commands previously generated/predicted by executable command generation device 110) generated by executable command generation device 110. In some embodiments, memory 206 and/or storage 208 additionally store various machine learning sub-models including their model parameters, such as word embedding models, Bidirectional Long short-term memory (BiLSTM) models, Fast Region-based Convolutional Neural Network (RCNN) model, and softmax models that are used for executable command generation. The various types of data may be stored permanently, removed periodically, or disregarded immediately after the data is processed.

As shown in FIG. 2, in some embodiments, processor 204 includes multiple modules, such as an utterance feature extraction unit 240, a visual feature extraction unit 242, a command feature extraction unit 244, a feature fusion unit 246, and a selection gate unit 248, and the like. In some embodiments, these modules (and any corresponding sub-modules or sub-units) are hardware units (e.g., portions of an integrated circuit) of processor 204 designed for use with other components or are software units implemented by processor 204 through executing at least part of a program. In some embodiments, the program is stored on a computer-readable medium, and when executed by processor 204, will perform one or more functions. Although FIG. 2 shows units 240-248 all within one processor 204, it is contemplated that these units may be distributed among different processors located closely or remotely with each other.

In some embodiments, units 240-248 execute a computer program to apply machine learning model/network (e.g., machine learning model 105) to automatically generate/predicate executable commands based on model input 103. In some embodiments, when executing the program, the executable command will be generated in a segment-by-segment manner (e.g., one segment/token at a time). When generating a segment of the executable command, visual features (e.g., representing objects in the image) extracted from the image will first be aligned (e.g., using vector fusion) with utterance features extracted from the utterance to generate first fused features. The first fused features will then be aligned with current command features (e.g., features of executable command generated up to t th time step) generated based on previous command features (e.g., features of executable command generated up to (t−1) th time step) used for generating a previous segment of the predicted executable command to generate second fused features. A total token score (e.g., weighted probabilities) will be calculated for each candidate token in a predetermined vocabulary based on the second fused features, the current command features, the utterance features, and the concept features. The candidate token with the highest total token score will be selected as the segment of the executable command and will be combined with previously generated segments of the executable command to generate the executable command.

Figure 3:
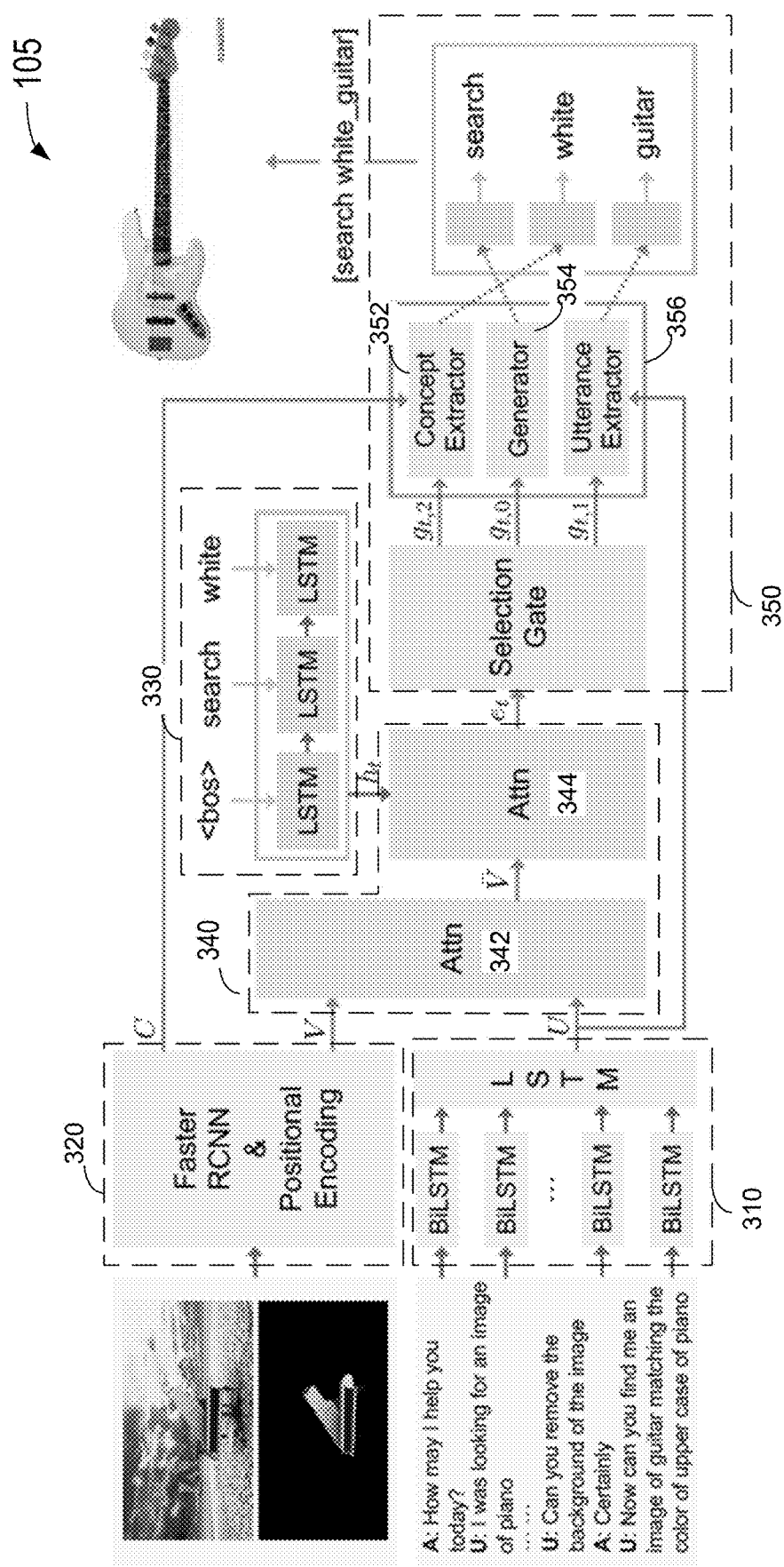
FIG. 3 illustrates a block diagram of a machine learning model for generating executable commands for controlling the image editing device, according to embodiments of the disclosure.

For example, FIG. 3 illustrates a schematic diagram of machine learning model 105 for generating/predicating executable commands based on model input 103, according to embodiments of the disclosure. In some embodiments, machine learning model 105 includes an utterance sub-model 310, a visual sub-model 320, a command sub-model 330, an attention network 340, and a selection gate 350. FIG. 3 will be described together with units 240-248 in FIG. 2.

Figure 4:
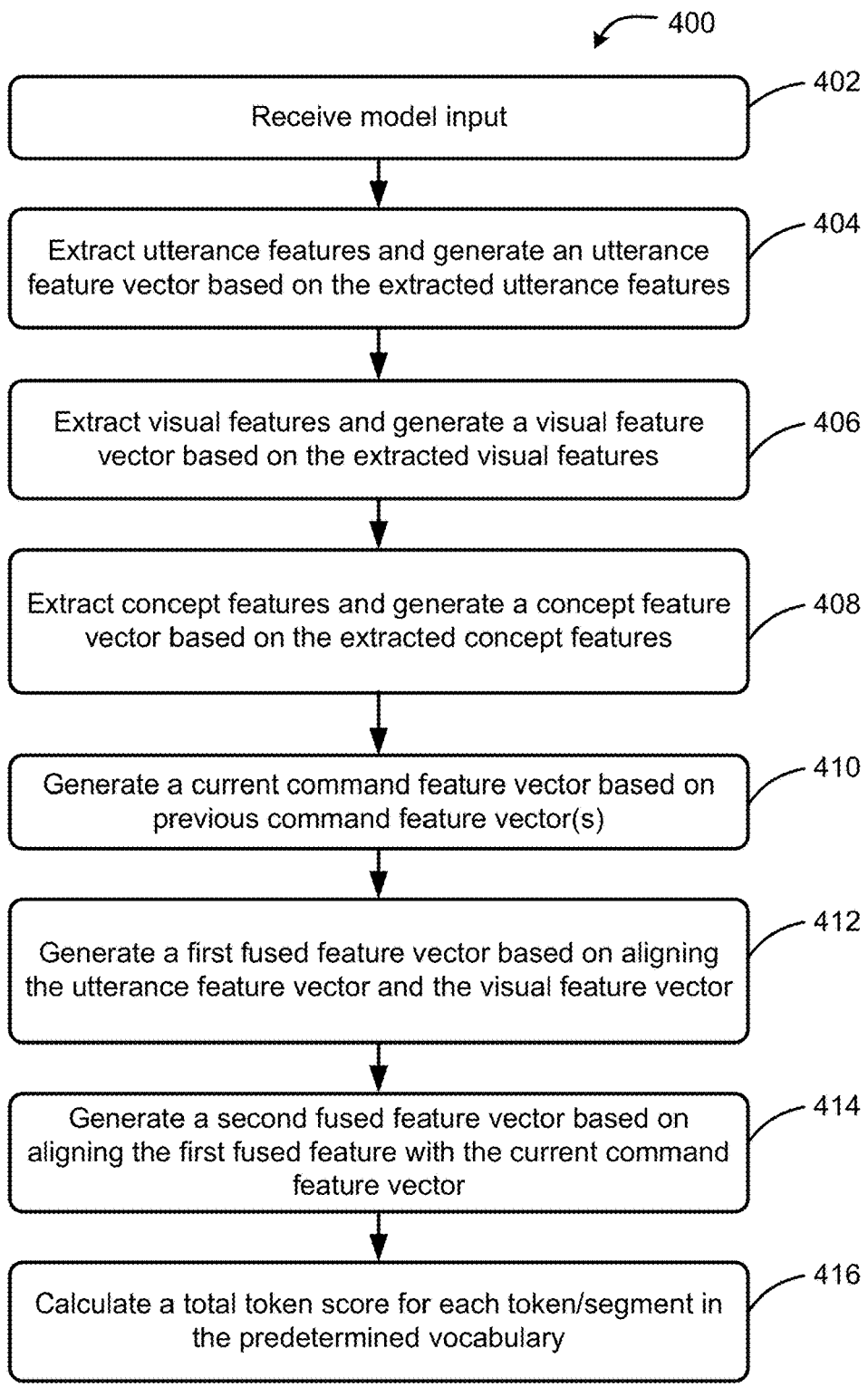
FIG. 4 illustrates a flowchart of an exemplary method for generating executable commend, according to embodiments of the disclosure.
Figure 7:
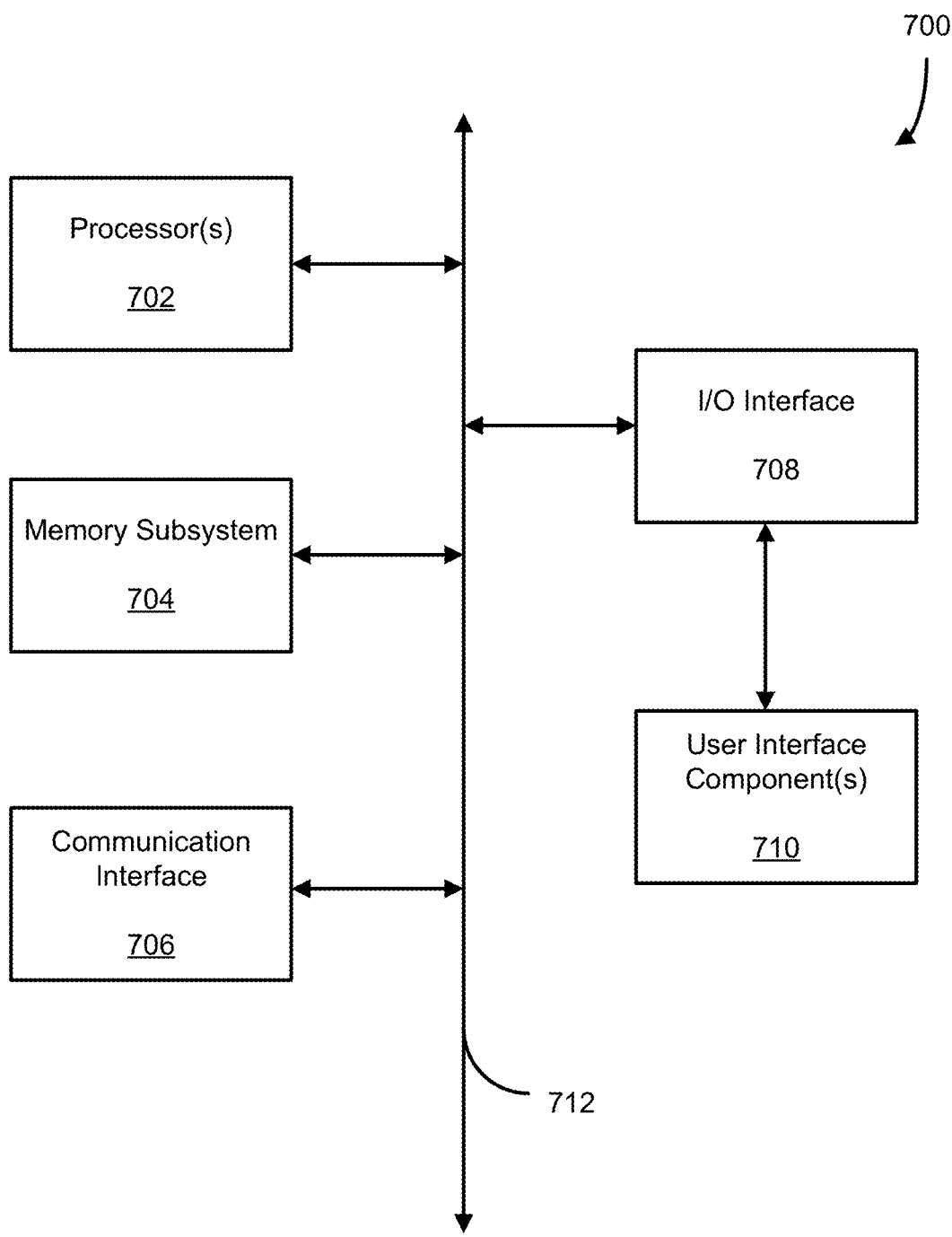
FIG. 7. shows a block diagram of an example computing device for implementing the methods, systems, and techniques described herein in accordance with some embodiments.

In some embodiments, units 240-248 of FIG. 2 execute computer instructions to perform the prediction/generation. For example, FIG. 4 illustrates a flowchart of an exemplary method 400 for generating/predicating executable commands, according to embodiments of the disclosure. In some embodiments, method 400 is implemented by executable command generation device 110 and particularly processor 204 or a separate processor not shown in FIG. 2. In some embodiments, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 400. Example components of the computerized apparatus are illustrated in FIG. 7, which are described in more detail below.

In some embodiments, method 400 includes operations 402-416 as described below. It is to be appreciated that some of the operations may be performed simultaneously, or in a different order than shown in FIG. 4. FIG. 4 will be described together with FIGS. 2 and 3.

In operation 402, communication interface 202 receives model input 103 from database/repository 150. In some embodiments, model input 103 includes an image a user intends to operate on, and utterance(s) acquired by input device 160, indicating the operation the user intended to perform. In some embodiments, the utterance history (e.g., utterances previously entered by the user during a same operation session/conversation/dialogue), the image history (e.g., images the user previously operated on), and/or previously executed commands (e.g., executable commands previously generated/predicted by executable command generation device 110 and/or manually selected by the user) along with model input 103 are fed to processor 204 (e.g., to different units in units 240-248 and the corresponding sub-models in machine learning network 105) for generating/predicting executable commands.

In operation 404, utterance feature extraction unit 240 extracts utterance features from a "dialogue" that includes the utterance included in model input 103, the utterance history, and/or the previously executed commands to generate an utterance feature vector based on the utterance features. For example, when forming the "dialogue," the utterance and the utterance history are combined, and the previously executed commands are appended to the last utterance in the combination.

For example, as illustrated in FIG. 3, the utterance is represented by an utterance feature vector U after being processed by utterance sub-model 310. Specifically, in some embodiments, utterance sub-model 310 includes a bidirectional LSTM sub-network for encoding sequences of tokens (e.g., segments in the utterance) from the utterance $W^u$ to generate utterance features $\dot{U} \in R^{M \times N \times d}$ according to equation (1):

$$\dot{U} = \text{BiLSTM}(\text{Embed}(W^u)) \qquad (1)$$

where M denotes the dialogue length (e.g., the number of utterances/previously executed commands in the "dialogue"), N denotes the utterance length (e.g., the number of words in each utterance), and d denotes the number of feature dimensions. In some embodiments, utterance sub-model 310 also includes a LSTM sub-network where the last forward hidden state and the first backward hidden state of utterance features U are extracted and concatenated, and are fed to the LSTM sub-network to generate the utterance feature vector U according to equation (2):

$$U = \text{LSTM}(\dot{U}_{N-1}^f; \dot{U}_0^b) \qquad (2)$$

In operation 406, visual feature extraction unit 242 extracts visual features from the image included in model input 103 to generate an image feature vector based on the image features extracted from the image. For example, as illustrated in FIG. 3, the visual features $\hat{V}$ representing objects in the image and the corresponding bounding box features B are extracted from the image by visual sub-model 320 and are combined to generate image features V. Specifically, in some embodiments, visual sub-model 320 includes a Faster RCNN sub-network for extracting the visual features $\hat{V}$ and the corresponding bounding box features B from the image. In some embodiments, visual sub-model 320 also includes a linear layer for combining V and B to generate image features vector V according to equation (3):

$$\dot{V}, B, W^c = FRCNN(I), V = PE(\text{Linear}([\dot{V}; B])) \qquad (3)$$

where PE denotes positional encoding which is applied to the image (e.g., the same encoding value is applied to the visual feature from the same image).

In operation 408, visual feature extraction unit 242 also extracts concept features from the image included in model input 103 to generate a concept feature vector based on the concept features extracted from the image. For example, as illustrated in FIG. 3, the concept features $W^c$ (e.g., consists of tokens/text labels of the objects from the image I) are extracted from the image by visual sub-model 320 and are encoded to generate the concept feature vector C. In some embodiments, concept features extracted from the image includes object names and/or other attributes (e.g., size, color, location, etc.) and are in a textual semi-symbolic format (e.g., text labels).

Specifically, in some embodiments, visual sub-model 320 includes a word embedding layer and a bidirectional LSTM sub-network for encoding the concept features $W^c$ to generate the concept feature vector C according to equation (4):

$$\dot{C} = \text{Embed}(W^c), C = PE(\text{BiLSTM}(\dot{C})) \qquad (4)$$

In operation 410, command feature extraction unit 244 generates a current command feature vector (e.g., in t th time step) based on previous command feature vector(s) used for generating previously generated segment(s) of the executable command (e.g., from 1 stto (t−1) th time step). For example, as illustrated in FIG. 3, command sub-model 330 includes an embedding layer and a LSTM layer. Tokens from previous segment(s) of the predicted executable command $\{w_t\}_{t=1}^T$ are embedded in the embedding layer and are fed to the LSTM layer sequentially to generate current command feature vector $h_t$ according to equation (5):

$$\hat{w}_{t-1} = \text{Embed}(w_{t-1}), h_t = \text{LSTM}(\hat{w}_{t-1}, h_{t-1}) \qquad (5)$$

In operations 412 and 414, feature fusion unit 246 generate a first fused feature vector based on aligning the utterance feature vector U and the visual feature vector V, and generate a second fused feature vector based on aligning the first fused feature with the current command feature vector $h_t$. For example, as illustrated in FIG. 3, attention network 340 calculates a similarity matrix $S \in R^{O \times M}$ between the utterance feature vector U and the visual feature vector V, where $S_{ij} = V_i^T U_j$ and O is the total number of all features extracted from the images. In some embodiments, attention network 340 includes two structurally identical attention sub-networks 342 and 344 with different parameters (e.g., trainable parameters) for implementing the attention mechanism between the utterance feature vector U and the visual feature vector V, and between the first fused feature vector (e.g., fused based on the utterance feature vector U and the visual feature vector V) and current command feature vector $h_t$ respectively.

Specifically, attention sub-network 342 calculates fused utterance features $\overline{U}$ and fused visual features $\overline{V}$ (e.g., the first fused feature vector) based on the similarity matrix S according to equation (6):

$$\overline{U} = \text{softmax}(S) \cdot U, \overline{V} = [V; \overline{U}; V \odot \overline{U}] \cdot W_v \quad (6)$$

Where $W_v \in R^{3d \times d}$ is the trainable parameter, $\odot$ denotes the element-wise product, • denotes matrix multiplication. Attention sub-network 344 calculates the second fused feature vector et according to equation (7):

$$e_t = \text{Attn}(h_t, \overline{V}) \quad (7)$$

Figure 5:
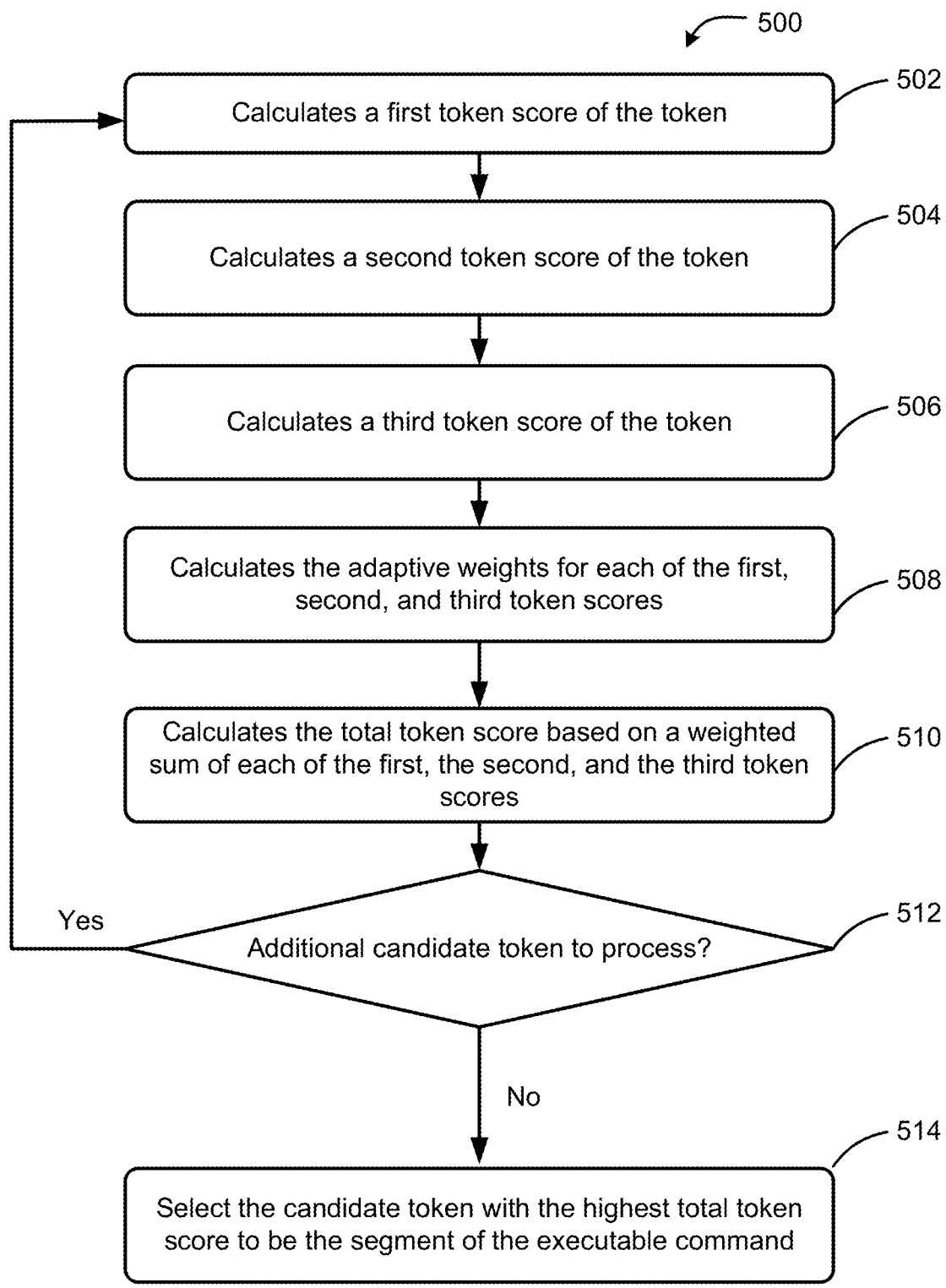
FIG. 5 illustrates a flowchart of an exemplary method for calculating a total token score for each candidate token in the predetermined vocabulary, according to embodiments of the disclosure.

In operation 416, selection gate unit 248 calculates a total token score (e.g., a weighted probability) for each candidate token/segment in the predetermined vocabulary (e.g., a vocabulary including all the candidate tokens that is possible to present in the executable commend). For example, FIG. 5 illustrates a flowchart of an exemplary method 500 for calculating a total token score for each candidate token in the predetermined vocabulary, according to embodiments of the disclosure. In some embodiments, method 500 is implemented by executable command generation device 110 and particularly selection gate unit 248 of processor 204 or a separate processor not shown in FIG. 2. In some embodiments, method 500 includes operations 502-514 as described below.

In some embodiments, as illustrated in FIG. 3, selection gate 350 includes a concept extractor 352, a generator 354, and an utterance extractor 356 for calculating a first token score $a^c_t$ (e.g., a first probability), a second token score $a^g_t$ (e.g., a second probability), and a third token score $a^u_t$ (e.g., a third probability) based on the channels' own vocabulary (e.g., candidate tokens), and the corresponding adjusted weight (e.g., $g_{t,0}$ for $a^g_t$, $g_{t,1}$ for $a^u_t$, and $g_{t,2}$ for act). For example, concept extractor 352 has a vocabulary that includes candidate tokens that are determined to be possible image concept features. For example, when defining concept extractor 352's vocabulary, a prediction is made ahead of time regarding all the tokens that could potentially become part of the image concept features (e.g., possible text labels associated with images, such as blue, apple, right top corner, etc.). Concept extractor 352 determines first token score $a^c_t$ based on concept extractor 352's vocabulary and the second fused features (disclosed in detail below). Similarly, utterance extractor 356 has utterance extractor 356's vocabulary and determines third token score $a^u_t$ based on the vocabulary and the current command features (disclosed in detail below). In some embodiments, generator 354 has the largest vocabulary that includes all candidate tokens that are possible in the "dialogue" (e.g., possible image concept features, possible utterance features, and/or command features), and generator 354 determines the second token score abased on generator 354's vocabulary and the second fused features (disclosed in detail below).

Accordingly, selection gate 350 calculates a total token score based on (e.g., a weighted sum of) the first token score $a^c_t$, the second token score $a^g_t$, and the third token score $a^u_t$, weighted by the corresponding adjusted weight (e.g., $g_{t,0}$ for $a^g_t$, $g_{t,1}$ for $a^u_t$, and $g_{t,2}$ for $a^c_t$) for every candidate token in generator 354's vocabulary. The candidate token with the highest total token score will be selected as the token for the segment of the executable command. In some embodiments, the segment of the executable command will be combined with (e.g., appended to the end of) the existing (e.g., previously generated/predicted) segment(s) of the executable command. The segment of the executable command will be generated/predicted one at a time until the executable command is complete (e.g., a last segment of the executable command is generated).

Specifically, for a first candidate token in the generator 354's vocabulary, in operations 502, selection gate unit 248 calculates the first token score $a^c_t$ of the first candidate token. For example, concept extractor 352 (e.g., shown in in FIG. 3) calculates the first token score $a^c_t$ based on the concept feature vector C and the second fused feature vector e according to equation (8):

$$(A^c_t)_i = e_t^T C_i, \ \alpha^c_t = \text{softmax}(A^c_t) \quad (8)$$

Accordingly, in some embodiments, concept extractor 352 can directly obtain useful information from the concept features since the concept features provides object names/attributes in a textual semi-symbolic format.

In operation 504, selection gate unit 248 calculates the second token score $a^g_t$, of the first candidate token. For example, generator 354 (e.g., shown in in FIG. 3) calculates the second token score $a^g_t$ based on the second fused feature vector e according to equation (9):

$$l_t = \text{Linear}(e_t), \alpha^g_t = \text{softmax}(l_t) \quad (9)$$

In operation 506, selection gate unit 248 calculates the third token score $a^u_t$ of the first token. For example, utterance extractor 356 (e.g., shown in in FIG. 3) calculates third token score $a^u_t$ based on the current command feature vector $h_t$ and the utterance feature vector U according to equation (10):

$$(A^u_t)_i = h_t^T U_i, \ \alpha^u_t = \text{softmax}(A^u_t) \quad (10)$$

Since the utterance(s) (e.g., including the utterance history) contain direct clues for generating segments of the executable commands, in some embodiments, utterance extractor 356 can benefit directly from extracting keywords from the context of the utterance(s).

In operation 508, selection gate unit 248 calculates the adaptive weights gt$\in R^{1 \times 3}$ for each of the first the second and the third token scores (e.g., gt includes the value of $g_{t,0}$, $g_{t,1}$, and $g_{t,2}$, where $g_{t,0}$ corresponds to $a^g_t$, $g_{t,1}$ corresponds to $a^u_t$, and $g_{t,2}$ corresponds to act). For example, selection gate 350 (e.g., shown in in FIG. 3) calculates the adaptive weights gt based on the second fused feature vector e according to equation (11):

$$g_t = \text{softmax}(W_g^T e_t) \quad (11)$$

where $W_g$ is the trainable parameter.

In operation 510, selection gate unit 248 calculates the total token score p($W_t$|$W_{1:t}$−1, I,D) (e.g., the weighted sum of each of the first, the second, and the third token scores) of the first candidate token. For example, selection gate 350 (e.g., shown in in FIG. 3) calculates the total token score p($W_t$|$W_{1:t}$−1, I,D) according to equation (11):

$$p(w_t | w_{1:t-1}, I, D) | = g_{t,0} \cdot \alpha^g_t + g_{t,1} \cdot \alpha^u_t + g_{t,2} \cdot \alpha^c_t \quad (11)$$

In some embodiments, the calculation of the total token score is optimized by minimizing a loss. The loss is defined as:

$$L = -\sum_{t=1}^{T} \log p(w_t^* | w_{0:t-1}, I, D) \quad (12)$$

In operation 512, selection gate unit 248 determines whether to calculate a total token score for another candidate token in the generator 354's vocabulary. If yes, method 500 proceeds back to operation 502 to determine a first token score for the another candidate token. If no (e.g., all candidate tokens have a total token score determined using method 500), method continues to operation 514.

In operation 514, selection gate unit 248 selects the candidate token with the highest total token score to be the segment of the executable command. In some embodiments, as illustrated in FIG. 3, the segment of the executable command will be combined with the existing/previously generated/predicted segment(s) of the executable command. Method 500 will generating new segment of the executable command until the executable command is complete (e.g., a last segment of the executable command is generated).

Figure 9:
FIG. 9 shows a conceptual diagram of an example of the outputs generate by a selection gate, according to according to embodiments of the disclosure.

FIG. 9 shows exemplary selection gate 350 outputs, according to some embodiments of the disclosure. As illustrated in FIG. 9, each predicted segments in a first executable command 901 (e.g., segments 910, 920, and 930) and in a second executable command 902 (e.g., segments 940 and 950) has a first, a second, and third token score calculated by one of concept extractor 352, generator 354, and utterance extractor 356 of selection gate 350 (e.g., shown in in FIG. 3). Take segment 910 as an example, first token score 914, second token score 916, and third token score 912 are generated by concept extractor 352, generator 354, and utterance extractor 356 based on method 500 disclosed above. Specifically, since the token "search" is only in generator 354's vocabulary (e.g., possible for potential command features) and not in concept extractor 352's and utterance extractor 356's vocabularies, first token score 914 and second token score 916 are both determined as 0, and third token score 912 is calculated as 1 according to equation (9) shown above.

Figure 6:
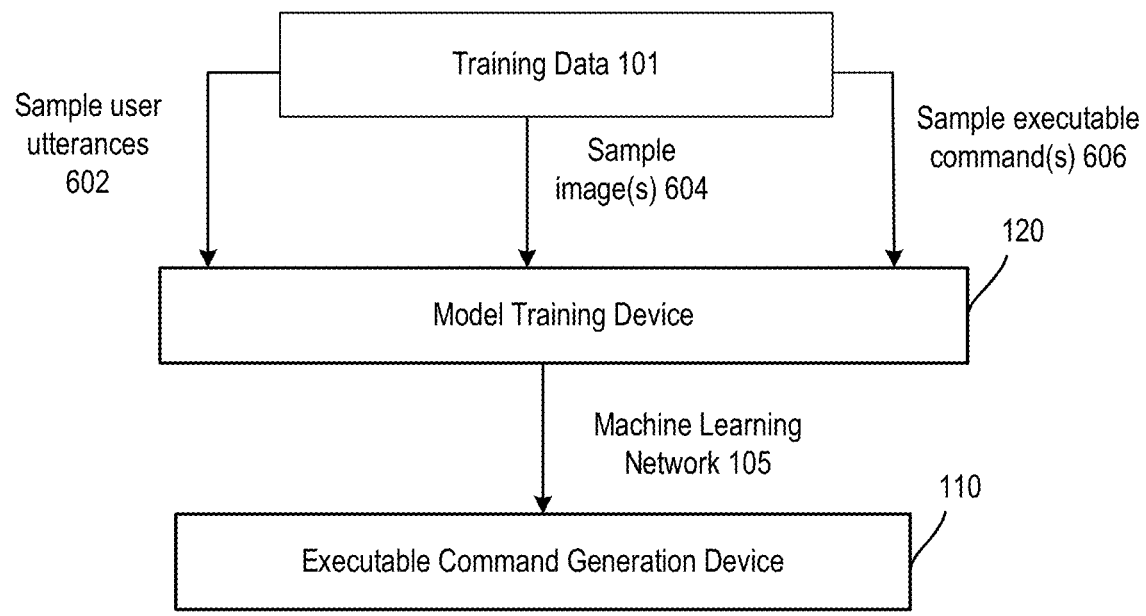
FIG. 6 illustrates a conceptual diagram of training a learning model, according to embodiments of the disclosure.
Figure 10A:
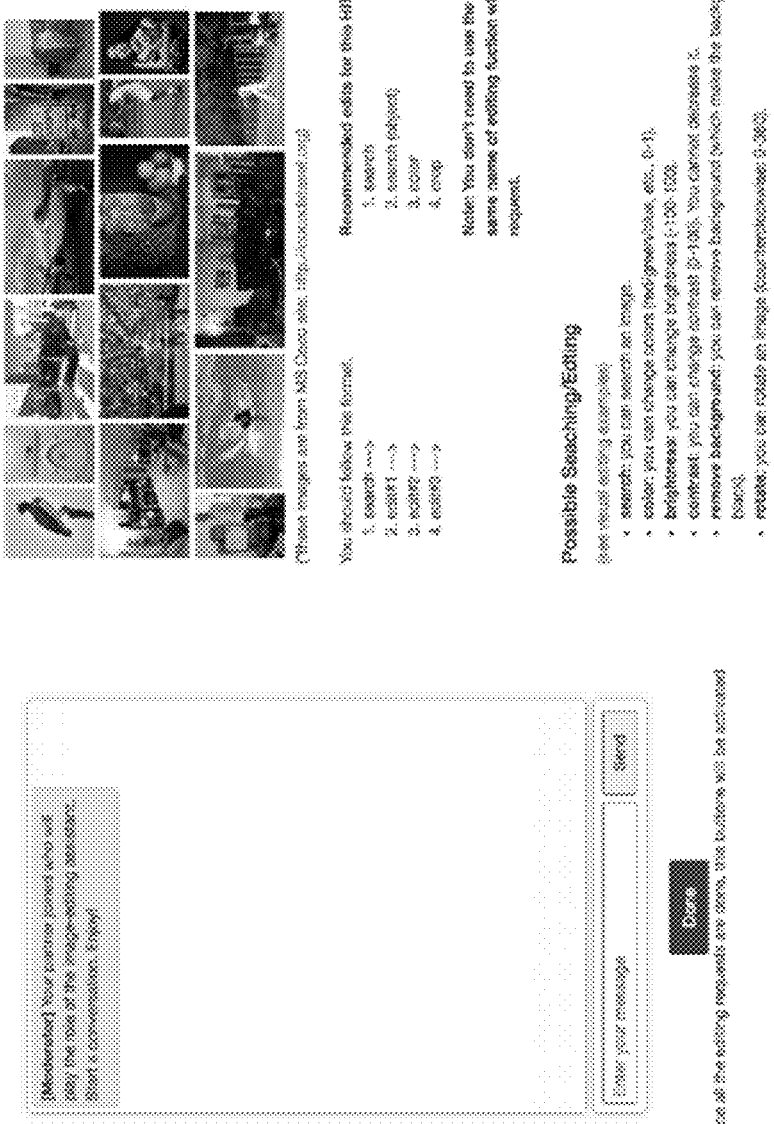
FIGS. 10A and 10B show exemplary data collection interface for user-annotators and assistant-annotators respectively, according to according to embodiments of the disclosure.
Figure 10B:
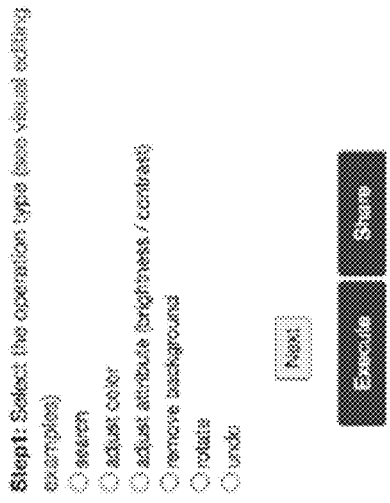
Figure 10B:
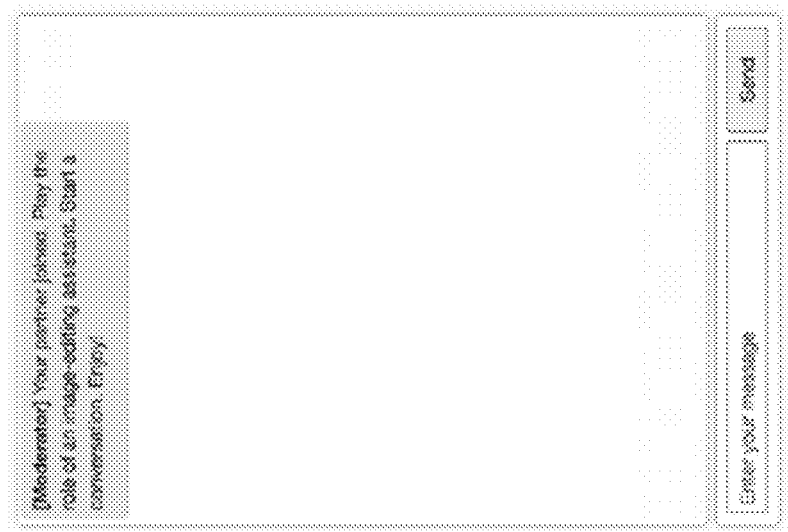

FIG. 6. illustrates a schematic diagram of an exemplary method 600 for learning model (e.g., machine learning network 105) training, according to embodiments of the disclosure. Consistent with some embodiments as shown in FIG. 6, model training device 120 uses training data 101 as an input for model training. In some embodiments, training data 101 includes sample utterances 602, sample image(s) 604, and corresponding sample executable command(s) 606 that are grouped together. When performing training, operators (e.g., annotators) manually associate the sample executable commends with the sample utterance and the sample image. For example, in some embodiments, annotators are split in two groups, e.g., the user-annotators and the assistance-annotators. In some embodiments, user-annotators will give request (e.g., intended operations) by making utterances (e.g., make four or more requests throughout a conversation). Assistant-annotators will perform the operations intended by the user-annotators' utterance (e.g., select the corresponding sample executable commend). For example, FIGS. 10A and 10B show exemplary data collection interface for user-annotators and assistant-annotators respectively, according to according to embodiments of the disclosure.

Based on sample utterances 602, sample image(s) 604, and corresponding sample executable command(s) 606, model training device 120 determines/trains one or more parameters in at least one sub-network/model in machine learning network 105 (e.g., trainable parameters of $W_v$ and $W_g$). For example, a convolutional layer in machine learning network 105 may include at least one filter or kernel. One or more parameters, such as kernel weights, size, shape, and structure, of the at least one filter may be determined by e.g., an end-to-end manner, or a backpropagation-based training process using training data 101 that includes grouped sample utterances 602, sample image(s) 604, and corresponding sample executable command(s) 606. Consistent with some embodiments, machine learning network 105 may be trained using supervised, non-supervised, or semi-supervised method. Using method 600, model training device 120 generates a trained learning model (e.g., machine learning network 105) as an output. Executable command generation device 110 can then use the trained learning model for executable command generation/prediction.

In some embodiments, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations/operations of the method 600. Example components of the computerized apparatus are illustrated in FIG. 7, which are described in more detail below.

FIG. 7 shows a schematic diagram of components of a computing device 700 that is implemented in a computing system in accordance with some implementations. As illustrated, computing device 700 includes a bus 712 that directly or indirectly couples one or more processors(s) 702, a memory subsystem 704, a communication interface 706, an input/output (I/O) interface 708, and/or one or more user interface components 710. It should be noted that, in some embodiments, various other components are included in a computing device that are not shown in FIG. 7, and/or one or more components shown in FIG. 7 are omitted.

In some embodiments, computing device 700 includes or is coupled to a memory subsystem 704. Memory subsystem 704 includes a computer-readable medium (e.g., non-transitory storage medium) or a combination of computer-readable media. Examples of computer-readable media include optical media (e.g., compact discs, digital video discs, or the like), magnetic media (e.g., hard disks, floppy disks, or the like), semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media includes non-volatile memory, volatile memory, or a combination thereof. In some embodiments, memory subsystem 704 also includes one or more hardware devices such as a solid-state memory, one or more hard drives, one or more optical disk drives, or the like. In some embodiments, memory subsystem 704 stores content files such as text-based files, audio files, image files, and/or video files, etc. In some implementations, the content files include documents, pictures, photos, songs, podcasts, movies, etc. In some embodiments, memory subsystem 704 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 702, or processor(s) of another computing device communicatively coupled to computing device 700) to perform various operations or functions such as those described with reference to FIGS. 2-6. In some embodiments, a computer program product is referred to as a non-transitory computer readable medium storing or comprising instructions to perform certain operations or functions. Examples of a computer program product include firmware, software driver, operating system, or software application. Examples of a software application include data management application (e.g., file management application, document management application, media management application, database application, etc.), communication application (e.g., email application, messaging application, teleconference or meeting application, social media application, etc.), productivity application (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity application (e.g., image, drawing, photo, audio, or video creation or editing application, web page development application, virtual or augmented reality creation or editing application, graphic design application, etc.), or the like.

In some embodiments, a computer program product such as any of the example software application are implemented using one or more neural network or machine learning models. In such embodiments, one or more neural network or matching learning models are trained using computing device 700 (or a computing system that includes computing device 700). Furthermore, in some implementations, computing device 700 (or a computing system include computing device 700) executes the one or more neural network or machine learning models as part of the computer program product to perform inference operations. It should be noted, in some embodiments, the neural network or matching learning model(s) are trained using a computing device or system that is the same as, overlaps with, or is separate from the computing device or system performing inference operations.

Communication interface 706 is used by computing device 700 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In some embodiments, communication interface 706 utilizes various drivers, wireless communication circuitry, network interface circuitry, or the like to enable communication via various communication networks.

I/O interface 708 includes various drivers and/or hardware circuitry for receiving input from various input devices, providing output to various output devices, or exchanging input/output with various input/output devices. Examples of devices coupled to I/O interface 708 include peripheral devices such as a printer, a docking station, a communication hub, a charging device, etc. In some implementations, some devices coupled to I/O interface 708 are used as user interface component(s) 710. In one example, a user operates input elements of user interface component(s) 710 to invoke the functionality of computing device 700 and/or of another device communicatively coupled to computing device 700; a user views, hears, and/or otherwise experiences output from computing device 700 via output elements of user interface component(s) 710. Some user interface component(s) 710 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

Various embodiments are described herein which are intended to be illustrative. Alternative embodiments may be apparent to those of ordinary skill in the art without departing from the scope of the disclosure. In one example, one or more features from one embodiment are combined with another embodiment to form an alternative embodiment. In another example, one or more features are omitted from an embodiment to form an alternative embodiment without departing from the scope of the disclosure. Additionally, it should be noted that, in some implementations, certain features described herein are utilized without reference to other features described herein.

With reference to the various processes described above, it should be understood that the order in which operations are performed is not limited to the order described herein. Moreover, in some embodiments, two or more operations are performed concurrently and/or substantially in parallel. In some embodiments, what is described as a single operation is split into two or more operations (e.g., performed by the same device, performed by two or more different devices, etc.). In some embodiments, what is described as multiple operations is combined into a single (e.g., performed by the same device, etc.). Descriptions of various blocks, modules, or components as distinct should not be construed as requiring that the blocks, modules, or components be separate (e.g., physically separate) and/or perform separate operations. For example, in some implementations, two or more blocks, modules, and/or components are merged. As another example, a single block, module, and/or components is split into multiple blocks, modules, and/or components.

The phrases "in one embodiment," "in an embodiment," "in one example," and "in an example" are used herein. It should be understood that, in some cases, these phrases refer to the same embodiments and/or examples, and, in other cases, these phrases refer to different embodiments and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, or C" and "at least one of A, B, and C" should each be understood to mean {A}, {B}, {C}, {A, B}, {A, C}, {B, C}, or {A, B, C}.

What is claimed is:

1. A non-transitory computer-readable medium comprising instructions that, when executed by at least one processor, cause the at least one processor to perform operations comprising:
  receiving, via a user interface, an utterance indicating a request associated with an image;
  generating an utterance feature vector based on utterance features extracted from the utterance;
  accessing the image corresponding to the utterance;
  generating a visual feature vector by extracting bounding box features and visual features extracted from the image, combining the bounding box features and the visual features, and applying positional encoding to the combined bounding box features and visual features;
  generating a concept feature vector based on concept features extracted from the image;
  generating a first fused feature vector based on aligning the utterance feature vector and the visual feature vector;
  generating a second fused feature vector based on aligning the first fused feature vector and a current command feature vector; and generating a segment of a predicted executable command corresponding to the request associated with image based on the second fused feature vector, the current command feature vector, the utterance feature vector, and the concept feature vector.

2. The non-transitory computer-readable medium of claim 1, wherein the current command feature vector is generated based on a previous command feature vector used for generating a previous segment of the predicted executable command.

3. The non-transitory computer-readable medium of claim 2, wherein the segment of the predicted executable command is generated from a predetermined vocabulary, and is generated by:
- determining a first probability for each candidate token in the predetermined vocabulary by a generator sub-model based on the second fused feature vector;
- determining a second probability for each candidate token in the predetermined vocabulary by a concept extractor sub-model based on the second fused feature vector and the concept feature vector;
- determining a third probability for each candidate token in the predetermined vocabulary by an utterance extractor sub-model based on current command feature vector and the utterance feature vector; and
- generating the segment of the predicted executable command based on a weighted sum of the first, the second, and the third probabilities of each candidate token in the predetermined vocabulary.

4. The non-transitory computer-readable medium of claim 1, wherein the concept features correspond to attributes of at least one object in the image.

5. The non-transitory computer-readable medium of claim 1, wherein the concept features are in a textual semi-symbolic format including at least a name of an object displayed in the image.

6. The non-transitory computer-readable medium of claim 1, wherein:
- the bounding box features and the visual features from the image are extracted using a convolutional network; and
- the bounding box features and the visual features are combined using a linear layer.

7. The non-transitory computer-readable medium of claim 1, wherein the utterance feature vector and the visual feature vector are aligned using an attention mechanism.

8. The non-transitory computer-readable medium of claim 7, wherein the first fused feature vector and the current command feature vector are aligned using the attention mechanism.

9. The non-transitory computer-readable medium of claim 1, wherein the utterance feature vector is generated further based on a sequence of previous utterances received via the user interface.

10. The non-transitory computer-readable medium of claim 1, wherein the request is an image search request or an image editing request.

11. A computer-implemented method for generating a predicted executable command for an image, the computer-implemented method comprising:
- receiving an utterance indicating a request associated with the image;
- generating an utterance feature vector based on inputting the utterance into a recurrent neural network;
- receiving the image corresponding to the utterance;
- generating a visual feature vector and a concept feature vector based on inputting the image into a convolutional network, the convolutional network configured to extract bounding box features and the visual features from the image, combine the bounding box features and the visual features, and apply positional encoding to the combined bounding box features and visual features to generate the visual feature vector;
- generating a first fused feature vector based on inputting the utterance vector and the visual vector to an attention mechanism;
- generating a second fused feature vector based on inputting the first fused feature vector and a command feature vector to the attention mechanism;
- calculating weighted probabilities for each candidate token in a predetermined vocabulary based on the second fused feature vector, the command feature vector, the utterance feature vector, and the concept feature vector; and
- generating a segment of the predicted executable command based on the weighted probabilities.

12. The computer-implemented method of claim 11, wherein the command feature vector is generated based on a previous command feature vector used for generating a previous segment of the predicted executable command.

13. The computer-implemented method of claim 12, wherein calculating the weighted probabilities for each candidate token in the predetermined vocabulary further comprises:
- determining a first probability for each candidate token in the predetermined vocabulary by a generator sub-model based the second fused feature vector;
- determining a second probability for each candidate token in the predetermined vocabulary by a concept extractor sub-model based on the second fused feature vector and the concept feature vector;
- determining a third probability for each candidate token in the predetermined vocabulary by an utterance extractor sub-model based on the command feature vector and the utterance feature vector; and
- generating the segment of the predicted executable command based on a weighted sum of the first, the second, and the third probabilities of each candidate token in the predetermined vocabulary.

14. The computer-implemented method of claim 11, wherein the concept features correspond to attributes of at least one object in the image.

15. The computer-implemented method of claim 11, wherein the concept features are in a textual semi-symbolic format including at least a name of an object displayed in the image.

16. The computer-implemented method of claim 11, wherein when being used for aligning the utterance feature vector and the visual feature vector, the attention mechanism has a first set of parameters, wherein when being used for aligning the first fused feature vector and the current command feature vector, the attention mechanism has a second set of parameters, and wherein the first set of parameters is different from the second set of parameters.

17. The computer-implemented method of claim 11, wherein the request is an image search request or an image editing request.

18. A command generation device comprising:
- at least one processor; and
- at least one non-transitory computer-readable apparatus comprising a plurality of instructions configured to, when executed by the at least one processor, cause the command generation device to:
- receive an utterance indicating a request associated with an image;

generate an utterance feature vector based on the utterance;

obtain the image corresponding to the utterance;

generate a visual feature vector by extracting bounding box features and visual features extracted from the image, combining the bounding box features and the visual features, and applying positional encoding to the combined bounding box features and visual features;

generate a first fused feature vector based on aligning the utterance feature vector and the visual feature vector;

generate a second fused feature vector based on aligning the first fused feature vector and a current command feature vector; and generate a segment of a predicted executable command corresponding to the request associated with the image based at least on the second fused feature vector.

19. The command generation device of claim 18, wherein:

the plurality of instructions are further configured to, when executed by the at least one processor, cause the command generation device to generate a concept feature vector based on concept features extracted from the image; and the generation of the segment of the predicted executable command is further based at least on the concept feature vector.

20. The command generation device of claim 18, wherein the segment of the predicted executable command is generated based on a probability associated with each candidate token in a predetermined vocabulary.

* * * * *

UNITED STATES PATENT AND TRADEMARK OFFICE
CERTIFICATE OF CORRECTION

| | | |
|---|---|---|
| PATENT NO. | : 12,293,577 B2 | Page 1 of 1 |
| APPLICATION NO. | : 17/651771 | |
| DATED | : May 6, 2025 | |
| INVENTOR(S) | : Seunghyun Yoon et al. | |

It is certified that error appears in the above-identified patent and that said Letters Patent is hereby corrected as shown below:

In the Claims

Column 18, Line 53 Claim 16: change "aligning the first fused feature vector and the current com-" to -- aligning the first fused feature vector and the com- --

Signed and Sealed this
Twenty-fourth Day of June, 2025

Coke Morgan Stewart
*Acting Director of the United States Patent and Trademark Office*